US006699297B1

United States Patent
Yamawaki et al.

(10) Patent No.: US 6,699,297 B1
(45) Date of Patent: Mar. 2, 2004

(54) METHOD FOR PREPARING LITHIUM MANGANATE AND POSITIVE ELECTRODE FOR LITHIUM SECONDARY CELL CONTAINING THE SAME

(75) Inventors: Tetsuya Yamawaki, Kanagawa (JP); Hideki Sakai, Kanagawa (JP)

(73) Assignee: Toho Titanium Co., Ltd., Chigasaki (JP)

(*) Notice: Subject to any disclaimer, the term of this patent is extended or adjusted under 35 U.S.C. 154(b) by 0 days.

(21) Appl. No.: 09/762,057

(22) PCT Filed: Mar. 29, 2000

(86) PCT No.: PCT/JP00/01947

§ 371 (c)(1),
(2), (4) Date: Sep. 17, 2001

(87) PCT Pub. No.: WO00/59830

PCT Pub. Date: Oct. 12, 2000

(30) Foreign Application Priority Data

Mar. 30, 1999 (JP) ............................................. 11-88185

(51) Int. Cl.⁷ ............................ H01M 4/04; H01M 4/50
(52) U.S. Cl. ................................ 29/623.1; 429/224
(58) Field of Search .......................... 429/224, 231.95; 29/623.1; 252/182.1

(56) References Cited

U.S. PATENT DOCUMENTS 5,531,920 A * 7/1996 Mao et al. .............. 252/182.1
5,879,654 A * 3/1999 van Ghemen et al. ... 423/594.4
6,334,993 B1 * 1/2002 Suita et al. .................. 423/599
6,383,235 B1 * 5/2002 Maegawa et al. .......... 29/623.5

FOREIGN PATENT DOCUMENTS

| EP | 959044 A1 | * 11/1999 | ........... C01G/45/00 |
| JP | 9161799 | 6/1997 | |
| JP | 09-161799 | * 6/1997 | |
| JP | 10182157 | 7/1998 | |
| JP | 10182161 | 7/1998 | |
| JP | 10289707 | 10/1998 | |
| JP | 11180717 | 7/1999 | |
| WO | WO9908964 | 2/1999 | |

* cited by examiner

Primary Examiner—Patrick Ryan
Assistant Examiner—Tracy Dove
(74) Attorney, Agent, or Firm—Westerman, Hattori, Daniels & Adrian, LLP

(57) ABSTRACT

A method for preparing lithium manganate having spinel structure which comprises contacting a manganese halide and lithium compound at a temperature of 100° C. or less in a liquid phase to react with each other; a lithium manganate which is prepared according to the method, is represented by the formula $Li_xMnO_y$, wherein x represents a real number satisfying $0<x\leq0.8$, and y represents a real number satisfying $1.8\leq y\leq 2.4$, and has an average particle diameter of 1 to 50 μm and a specific surface area of 10 to 15 m²/g; a positive electrode for a lithium secondary cell comprising the lithium manganate as an active material; and a lithium secondary cell using the positive electrode.

8 Claims, 2 Drawing Sheets

METHOD FOR PREPARING LITHIUM MANGANATE AND POSITIVE ELECTRODE FOR LITHIUM SECONDARY CELL CONTAINING THE SAME

TECHNICAL FIELD

The present invention relates to a process for producing lithium manganate with a spinel structure which is suitable for an electrode material of a lithium ion secondary battery, to lithium manganate obtained by the process, to the positive electrode for a lithium ion secondary battery employing the same and to a lithium ion secondary battery.

BACKGROUND ART

With recent advances in electronics technology, the downsizing of electronic devices such as personal computers and cellular phones is progressing at an accelerating pace. This has also led to downsizing of power sources, and thus to a recent increase in the development of lithium secondary batteries. From an environmental standpoint, electric automobiles have attracted attention and some have been put into practical use. Widespread use of such electric automobiles will require batteries with large capacities and excellent cycle characteristics as power sources, and the use of lithium ion secondary batteries for such large-sized batteries is therefore examined.

As concerns the positive electrode active materials for lithium batteries, manganese dioxide has been used for primary batteries and vanadium oxide or lithium and cobalt compounds have been used for secondary batteries. Lithium manganate oxides such as lithium manganate are being actively developed because of the inexpensiveness and absence of toxicity of their starting materials, which are manganese compounds, compared to cobalt compounds.

Among various lithium manganates, lithium manganates with a spinel structure, owing to their three-dimensional configuration, allow stable doping and undoping of lithium ions into crystal lattices without destruction of the crystal structure when used as positive electrode materials for lithium ion secondary batteries undergoing charge and discharge. Also, their high discharge voltage and stability make them very promising as positive electrode active materials for secondary batteries, such that much research has been directed in recent years toward rendering them practical for use. However, their theoretical capacity is as low as 148 mAh/g, and their charge/discharge cycle characteristics are poor. An important goal has therefore been to synthesis spinel-type lithium manganate of very high purity with the lithium and manganese evenly dispersed.

One of the preferred characteristics required of lithium manganate with a spinel structure used as a positive electrode substance for lithium ion secondary batteries is a maximized electrode surface, in cases with liquid conductive electrolytes, and specifically, it is preferred to have a high specific surface area, low crystallinity (low density), high pore volume and a high manganate number.

In the case of solid electrolytes, however, permeation through pores does not occur and therefore gaps are detrimental. In this case, then, the preferred characteristics required for the lithium manganate are a high specific surface area, high density, low pore volume and minimal granularity.

Conventionally, lithium manganate with a spinel structure is obtained from a lithium compound such as lithium hydroxide, lithium nitrate, lithium oxide, lithium carbonate or lithium acetate and a manganese compound such as manganese oxide, manganese carbonate or γ-MnOOH, as the starting materials, and is produced by solid phase reaction, solid phase sintering, melt impregnation, a hydrothermal method, electrodeposition or chelating.

However, since solid phase methods and solid phase sintering methods are carried out at high temperature, sintering occurs which reduces the specific surface area. It is therefore impossible to achieve charge and discharge with a high current density. In other words, because solid phase reaction is a batch reaction, such reactions are slow and non-uniform, and the resulting lithium manganate compounds have also had a non-uniform composition. Furthermore, because of the largeness of the particles obtained thereby, they are unsuitable as electrode materials and have exhibited particular deterioration in charge/discharge cycle characteristics. Solid phase reaction, which is a diffusion reaction, also requires the particles of the starting solids to be on the submicron level in order to accomplish a homogeneous reaction. However, manganese compounds and lithium compounds are usually large particles on the order of a few microns to several tens of microns, while lithium hydroxide particles are usually 100 microns or larger, such that it has been difficult to obtain a uniform mixture and homogeneous reaction has not been possible.

Synthesis by hydrothermal methods is carried out at a high temperature of 100 to 300° C. and under a high pressure of 300 atmospheres, and using a reaction apparatus which must be able to withstand these conditions increases energy costs and equipment costs. With melt impregnation, pulverization is necessary to obtain a highly porous manganese starting material, and pulverization can result in inclusion of impurities such as iron, thus posing a problem in terms of product purity.

For synthesis of more homogeneous lithium manganate, it has been attempted to synthesize lithium manganate with a spinel structure by liquid phase reaction. For example, in Japanese Unexamined Patent Publication No. HEI 2-183963 there is disclosed a process in which a divalent manganese salt and a lithium salt are reacted in an alkali aqueous solution to obtain a lithium-containing manganese hydroxide compound, and then the manganese hydroxide compound is oxidation treated, washed and heat treated at 800 to 900° C. to produce manganese oxide with a spinel structure. However, this process reduces the lithium component by the washing after oxidation treatment, such that the lithium content of the resulting product is lowered, and it is difficult to obtain lithium manganate having the desired Li/Mn molar ratio. Although it is a liquid phase reaction, the lithium manganate must be obtained by heat treatment after the manganese hydroxide compound has been produced by the liquid phase reaction.

Thus, the related art has not been able to achieve lithium manganate with a spinel structure that is useful as a positive electrode active material for a lithium ion secondary battery, nor has any inexpensive or convenient synthesis method existed.

On the other hand, a lithium ion secondary battery utilizing lithium manganate is disclosed in Japanese Unexamined Patent Publication No. HEI 1-109662 as a nonaqueous secondary battery with a lithium manganate compound represented by $LiMn_2O_4$ with a spinel structure as the positive electrode active material and a lithium alloy as the negative electrode active material, and employing a lithium ion-containing nonaqueous electrolyte. In Japanese Unexamined Patent Publication No. HEI 10-50316 there is disclosed an organic electrolyte secondary battery comprising a lithium-containing negative electrode and comprising as the positive electrode active material a $LiMn_2O_4$ compound synthesized from lithium carbonate and manganese dioxide.

The related art for such lithium ion secondary batteries employing lithium manganate as the positive electrode active material has improved charge/discharge capacity and cycle characteristics over the previously used batteries employing manganese oxide or chalcogenides of titanium, molybdenum or niobium as the positive electrode active material.

Nevertheless, with the increasing demands for even higher voltages and higher energy from secondary batteries in recent years, there has been a demand for secondary batteries with even larger charge/discharge capacities and more excellent charge/discharge cycle characteristics, and these demands have still not been satisfied by the related art and called for further improvement.

It is therefore an object of the present invention to provide a novel, inexpensive and convenient process for production of lithium manganate with a spinel structure that is useful as an electrode material, and especially a positive electrode active material, for a lithium ion secondary battery, and to further provide a lithium ion secondary battery positive electrode with excellent charge/discharge capacity and excellent charge/discharge cycle characteristics in a high-voltage, high-energy lithium ion secondary battery by using the lithium manganate obtained by this process, as well as the lithium ion secondary battery itself.

DISCLOSURE OF INVENTION

As a result of much diligent research aimed at solving the aforementioned problems, the present inventors have accomplished the present invention upon the discovery that lithium manganate with a spinel structure can be obtained by liquid phase reaction of a manganese halide and a lithium compound at ordinary temperature without increased temperature and increased pressure required in solid phase reactions or hydrothermal methods, and upon the discovery that this lithium manganate with a spinel structure is suitable for use as an electrode material, and especially a positive electrode active material, for a lithium ion secondary battery.

In other words, the process for production of lithium manganate with a spinel structure according to the present invention is characterized by contacting a manganese halide and a lithium compound in a liquid phase at 100° C. or below for reaction.

The lithium manganate of the present invention is lithium manganate with a spinel structure obtained by contacting a manganese halide and a lithium compound in a liquid phase at 100° C. or below for reaction, characterized in that the lithium manganate is represented by the chemical formula: $Li_xMnO_y$ (where x is a real number such that $0<x\leq0.8$ and y is a real number such that $1.8\leq y\leq2.4$), the mean particle size is 1 to 50 μm and the specific surface area is 10 to 100 $m^2/g$.

The positive electrode for a lithium ion secondary battery according to the present invention is characterized by comprising lithium manganate produced by the aforementioned process as its positive electrode active material.

The lithium ion secondary battery according to the present invention is characterized in that its positive electrode comprises the aforementioned lithium manganate as the positive electrode active material.

BEST MODE FOR CARRYING OUT THE INVENTION

Figure 1:
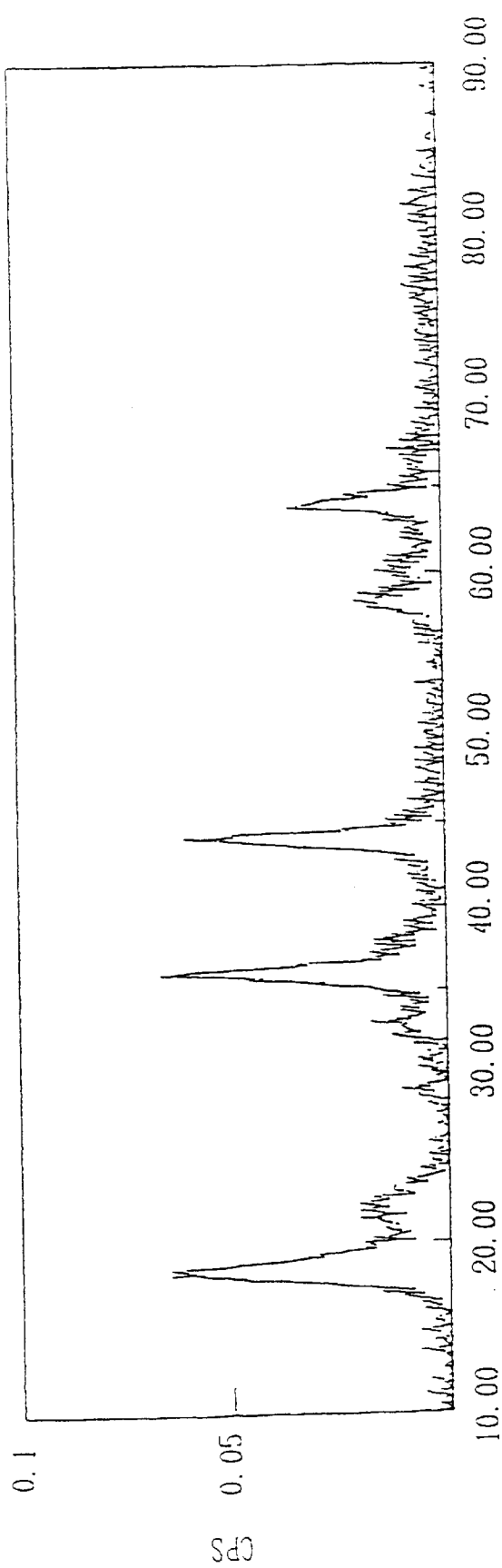
FIG. 1 is an X-ray diffraction spectrum of the lithium manganate obtained in Example 1.

The manganese halides used for production of the lithium manganate of the invention are specifically manganese (II) dichloride and manganese (III) trichloride, including anhydrides and hydrates thereof. Manganese (II) dichloride is more stable and is preferred of these two. A high purity is preferred to obtain a higher purity lithium manganate product, and specifically, it is preferable that the purity be 99 wt % or greater and more preferably 99.9 wt % or greater, containing other metal components such as Fe, Ni and Na by no greater than 0.1 wt % each as impurities.

When a halide is used for the manganese compound by a solid phase method or solid phase sintering method, the halogen component remains in the lithium manganate and is difficult to removed, and since this has an undesirable effect on the characteristics of the battery material when used therefor, the use of manganese halides as starting materials has been avoided in the past. According to the present invention, however, the manganese halide is used as an aqueous solution for reaction with the lithium compound in liquid phase, so that only the lithium manganate is produced as a solid and it includes none of the undesired halide compound, thus allowing production of high purity lithium manganate. Manganese halides such as manganese chloride are less expensive than manganese compounds that have been conventionally used, so that it becomes possible to produce lithium manganate at lower cost. Manganese chloride is therefore preferred as the manganese halide.

The lithium compound used for the invention may be of one or more compounds that can form aqueous solutions of lithium salts such as, specifically, lithium hydroxide, lithium chloride, lithium iodide, lithium bromide, lithium nitrate, lithium nitrite, lithium sulfate, lithium hydrogen sulfate, lithium carbonate, lithium hydrogen carbonate, lithium acetate, lithium oxide, lithium peroxide and lithium chlorate. Particularly preferred for use among these are lithium hydroxide, lithium chloride and lithium nitrate.

According to the present invention, lithium hydroxide and lithium chloride are preferably used in combination as starting materials for the lithium source. In the production process for lithium manganate according to the present invention, as will be explained below, the manganese halide and the lithium compound are contacted in liquid phase for reaction, and the pH at this time is preferably in the alkali region; the lithium hydroxide is preferably used not only as a starting material for the lithium source but also as an alkali source acting on the reaction. Hydroxides such as sodium hydroxide and potassium hydroxide may also be used as alkali sources in addition to the lithium hydroxide.

The lithium compound is also preferably of high purity, as is the aforementioned manganese halide, in order to obtain higher purity lithium manganate, and specifically, it is preferred that the purity be 99 wt % or greater and more preferably 99.9 wt % or greater, containing other metal components such as Fe, Ni and Na by no greater than 0.1 wt % each as impurities.

In addition to the aforementioned manganese halide and lithium compound, an oxidizing agent is also preferably used in the production process for lithium manganate according to the present invention in order to oxidize manganese and give the desired valence. It is particularly preferred to include an oxidizing agent when contacting manganese chloride and a lithium compound in liquid phase for reaction. Specific oxidizing agents include, hydrogen peroxide, potassium permanganate and chloric acid, among which hydrogen peroxide is particularly preferred for use because it leaves no impurity elements in the product after reaction.

It is a characteristic of the present invention that the aforementioned components as starting materials are contacted in liquid phase at 100° C. or below for reaction as described above, where contact in liquid phase for reaction means that the manganese halide and the lithium compound are contacted with each other in aqueous solution states for reaction, and not that the starting materials are reacted by contact in a suspended state in liquid phase. The reaction of the present invention is carried out by preparing aqueous solutions of these compounds and reacting them in liquid phase, however, a water-soluble organic solvent such as alcohol may be included as well. The present invention, therefore, is a process for production of lithium manganate with a spinel structure by a so-called sol-gel method or direct synthesis method.

The reaction temperature is 100° C. or below, preferably in the range of 20 to 100° C. and more preferably 50 to 95° C. The reaction temperature may be set as desired depending on its effect on the composition of the target lithium manganate, and for example, in the case of lithium manganate with an Li/Mn atomic ratio of 0.5 or less, the reaction temperature is 70° C. or below and preferably 30 to 60° C., and in the case of lithium manganate with an Li/Mn atomic ratio of 0.5 or greater, the reaction temperature is 60 to 100° C. and preferably 80 to 95 ° C. Here, the aqueous solutions of the manganese halide and the lithium compound may be contacted at ordinary temperature and then heated for reaction. However, for continuous production it is preferred to preheat the manganese halide and the lithium compound to the reaction temperature and then contact for reaction. The reaction time is normally one minute or longer and preferably 1 minute to 15 hours, after contacting the starting materials and bringing them to the prescribed reaction temperature.

The contact method and reaction method are not particularly restricted, and the following methods may be employed. 1) A mixed aqueous solution containing the lithium compound and the manganese halide is prepared at ordinary temperature and then heated for reaction. 2) A manganese halide aqueous solution at ordinary temperature is dropped into a lithium compound aqueous solution at ordinary temperature for contact and then heated for reaction. 3) A manganese halide aqueous solution at ordinary temperature is dropped into a preheated lithium compound aqueous solution for contact and then heated for reaction. 4) A preheated manganese halide aqueous solution is dropped into a preheated lithium compound aqueous solution for contact and then reacted. 5) A lithium compound aqueous solution at ordinary temperature is dropped into a manganese halide aqueous solution at ordinary temperature for contact and then heated for reaction. 6) A manganese halide and a lithium compound aqueous solution mixture at ordinary temperature is dropped into a lithium compound aqueous solution at ordinary temperature for contact and then heated for reaction. 7) A manganese halide and a lithium compound aqueous solution mixture at ordinary temperature is dropped into a preheated lithium compound aqueous solution for contact and then heated for reaction. 8) A preheated manganese halide and a lithium compound aqueous solution mixture is dropped into a preheated lithium compound aqueous solution for contact and then heated for reaction.

The oxidizing agent such as hydrogen peroxide is added at either the stage of contact or reaction, and for example, it may be added to the manganese halide aqueous solution before contact with the lithium compound, it may be added to the lithium compound aqueous solution before contact, or it may be added after contact between the manganese halide and the lithium compound. It is preferably added to the manganese halide aqueous solution before contact with the lithium compound, as this will allow preadjustment of the valence of the manganese.

The proportions of each of the starting materials may be as desired so long as they give the lithium manganate with the desired compositional ratio, but preferably, the lithium compound be 0.3 to 0.7 mole and more preferably 0.4 to 0.6 mole, and the hydrogen peroxide or other oxidizing agent be 0.3 to 2 moles and more preferably 0.6 to 1.5 moles, per mole of the manganese halide. When lithium hydroxide and lithium chloride are used as the lithium compounds, the lithium hydroxide be 1 to 5 moles and preferably 3 to 3.5 moles and the lithium chloride be 0.3 to 0.7 mole and preferably 0.4 to 0.6 mole, per mole of the manganese halide.

The above-mentioned starting materials are contacted in aqueous solution form, and although the concentration of each aqueous solution is not particularly restricted, the manganese halide aqueous solution is preferably 0.1 to 2 moles/liter and more preferably 0.8 to 1.2 moles/liter, and the lithium compound aqueous solution is preferably 0.05 to 1 mole/liter and more preferably 0.4 to 0.6 mole/liter. When a combination of lithium hydroxide and lithium chloride is used as the lithium compound, the lithium hydroxide aqueous solution is at 1 to 5 moles/liter and preferably 3 to 3.5 moles/liter and the lithium chloride is at 0.3 to 0.7 mole/liter and preferably 0.4 to 0.6 mole/liter, with respect to one mole of the manganese halide.

The pH of the liquid phase for contact and reaction in liquid phase as described above is normally 7 to 14, and preferably 7 to 11, and when lithium hydroxide is used as the lithium compound, the pH is adjusted according to the aqueous solution concentration thereof.

According to the present invention, a transition metal compound ion such as nickel, cobalt or iron may be added and coprecipitated for the liquid phase reaction to improve the battery characteristics of the lithium manganate, and the metal components doped to form a composite compound.

As explained above, the starting materials are contacted in liquid phase for reaction to obtain lithium manganate with a spinel structure. If necessary, the resulting lithium manganate is separated from the liquid phase and dried. When the lithium manganate is separated from the liquid phase, the lithium manganate obtained be preferably washed with demineralized water or an alcohol to remove the halogens or other free unreacted components remaining in the liquid phase. The separation method may be a commonly used one such as decantation, filtration or centrifugation. The drying may be carried out while heating with a vacuum dryer or the like.

According to the present invention, reaction of a manganese halide and lithium compound in liquid phase in this manner can directly produce lithium manganate with a spinel structure, but as another aspect of the present invention, the lithium manganate thus obtained is heat treated to further improve the crystallinity of the lithium manganate. The temperature for this treatment is normally 400 to 1000° C., preferably 400 to 800° C. and more preferably 500 to 750° C., and the heat treatment time is normally 1 to 30 hours, preferably 2 to 10 hours and more preferably 4 to 8 hours. The atmosphere for the heat treatment is usually air, but the treatment may also be carried out in an inert atmosphere such as argon or nitrogen, or in an oxygen atmosphere.

Thus, according to the present invention, production of lithium manganate with a spinel structure exhibiting greater homogeneity and high crystallinity is possible by forming lithium manganate with a spinel structure or a compound oxide or mixture of lithium manganate with a spinel structure and manganese oxide in a first stage, and separating and subjecting the same to heat treatment or firing treatment in a second stage. Since production processes for lithium manganate according to conventional solid phase methods employ firing at high temperature, the resultant sintering reduces the specific surface area and impairs the characteristics thereof as a positive electrode material. According to the present invention, however, the lithium manganate is already produced by a liquid phase reaction, and therefore the firing treatment in the second stage does not require the high temperature of conventional solid phase methods, so that the firing treatment can be achieved at a relatively low temperature.

The lithium manganate produced according to the present invention is specifically represented by the chemical formula: $Li_xMnO_y$ (where x is a real number such that $0<x\leq0.8$, preferably $0.40\leq x\leq0.7$ and more preferably $0.50\leq x\leq0.65$, and y is a real number such that $1.8\leq y\leq2.4$ and preferably $1.9\leq y\leq2.2$, and more preferably y=2.0). Specifically, compositions may include $Li_{0.50}MnO_2$, $Li_{0.56}MnO_2$ and $Li_{0.60}MnO_2$.

The lithium manganate produced according to the present invention may be a simple compound, a manganese compound oxide containing lithium manganate with a spinel structure and an oxide of manganese such as manganese oxide, or a mixture of said lithium manganate and manganese oxide. In the case of a manganese compound oxide or mixture, the component other than the lithium manganate with a spinel structure will be primarily manganese (III) oxide, and in some cases it may include lithium manganate with a perovskite structure. Its composition will usually be 50 to 100 wt % and preferably 80 to 100 wt % of the lithium manganate with a spinel structure, and 0 to 50 wt % and preferably 0 to 20 wt % of manganese (III) oxide.

The lithium manganate obtained in this manner has, before heat treatment, a mean particle size of 1 to 50 µm and preferably 5 to 30 µm, a specific surface area of 10 to 150 $m^2/g$ and preferably 30 to 130 $m^2/g$ and a BET size of 0.01 to 0.2 µm; after heat treatment, it has a mean particle size of 1 to 30 µm and preferably 1 to 20 µm, a specific surface area of 50 to 50 $m^2/g$ and preferably 5 to 30 $m^2/g$ and a BET size of 0.08 to 0.3 µm.

The present invention is a lithium ion battery positive electrode comprising the aforementioned lithium manganate, and the lithium battery positive electrode can be produced by arbitrarily adding electrode additives such as conducting agents and binders to the lithium manganate of the present invention. Specifically, conductive materials including graphite, carbon black, acetylene black, ketjen black or carbon fibers, metal powders or metal fibers of copper, nickel, aluminum, silver and the like, or polyphenylene derivatives. As binders there may be used polysaccharides, thermoplastic resins and polymers with rubber elasticity. Specifically there may be mentioned starch, polyvinyl alcohol, regenerated cellulose, polyvinyl chloride, polyvinylidene fluoride, polyethylene, polypropylene, ethylene-propylene rubber, polytetrafluoroethylene and the like. In addition, polypropylene and polyethylene may be added as fillers.

The lithium ion secondary battery of the present invention is constructed with a positive electrode made of the aforementioned lithium manganate and negative electrode, and a nonaqueous electrolyte containing lithium ion.

The active material of the negative electrode may be, for example, metallic lithium, a lithium alloy, a conductive polymer such as polyacetylene or polypyrrole doped with lithium ion, a compound of a metal chalcogenide such as $TiS_2$, $MoS_2$ or $NbSe_3$ doped with lithium ion, an inorganic compound such as $WO_2$, $MoO_2$, $Fe_2O_3$ or $TiS_2$, or graphite; substances containing lithium are preferred among these, with lithium alloys being particularly preferable. Specifically, these alloys include alloys of lithium with at least one from among aluminum, zinc, tin, lead, bismuth, cadmium, silver and tellurium, among which alloys of lithium and aluminum or alloys of lithium, silver and tellurium are preferred.

When a lithium alloy is used as the negative electrode active material, the lithium content in the alloy will differ depending on the metal with which it is combined, but in terms of atomic ratio it may be 10 to 95%, and preferably 40 to 70%. The lithium alloy can be obtained by a publicly known process, examples of which include melt alloy processes, electrolyte deposition in an electrolyte solution, and melt plating processes. When producing a lithium alloy with these processes, a diffusion barrier layer of nickel, cobalt, iron or the like or a wetting-promoter layer of silver, copper, zinc, magnesium or the like may be formed on the substrate surface if necessary.

The nonaqueous electrolyte containing the lithium ion for the lithium ion secondary battery is composed of a solvent and lithium salt, and as solvents there may be mentioned organic solvents such as propylene carbonate, ethylene carbonate, butylene carbonate, dimethyl carbonate, diethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane and ethylmonoglyme. Lithium salts include $LiPF_6$, $LiClO_4$, $LiCF_3SO_3$, $LiN(CF_3SO_2)_2$ and $LiBF_4$. These lithium salts are dissolved in the aforementioned solvent to form a nonaqueous electrolyte, and the above-mentioned positive electrode and negative electrode are combined therewith to construct the lithium ion secondary battery of the present invention.

It is therefore a feature of the present invention that a manganese halide and a lithium compound are contacted at 100° C. or below for reaction to produce lithium manganate with a spinel structure by a so-called sol-gel method or direct synthesis method. This allows lithium manganate with a spinel structure to be produced more conveniently and at lower cost than by conventional processes. The production process of the present invention uses the starting materials in homogeneous solution and contacts them in liquid phase for reaction, so that it becomes possible to obtain lithium manganate with a spinel structure that is more homogeneous and more suitable as an electrode material for high purity lithium ion secondary batteries than those obtained by conventional solid phase processes. Furthermore, by using the lithium manganate as a positive electrode active material, it is possible to obtain a lithium ion secondary battery with excellent charge/discharge capacity and excellent charge/discharge cycle characteristics, as compared to conventional lithium ion secondary batteries.

EXAMPLE

Examples will now be provided as further detailed explanation of the present invention, however, these are intended only as illustration and not restrictions on the invention. The X-ray diffraction measurement (Table 1), mean particle size measurement, and specific surface area measurement of the lithium manganates used in the examples and comparative examples were performed by the methods described below.
(X-ray Diffraction Measurement)

TABLE 1

| Diffraction apparatus | RAD-1C (Rigaku Corporation) |
|---|---|
| X-ray tube | Cu |
| Tube voltage/tube current | 40 kv, 30 mA |
| Slit | DS-SS: 1°, RS: 0.15 mm |
| Monochrometer | Graphite |
| Measurement interval | 0.002° |
| Scaling method | Timed scaling method |

(Mean Particle Size Measurement)

This was measured using a laser diffraction particle size measurement apparatus (LA-700 by Horiba Ltd.)
(Specific Surface Area Measurement)
Measured by the BET method.

Example 1

After loading 0.8 liter of 3.25 mole/liter lithium hydroxide aqueous solution into a 2-liter flask equipped with a 1-liter dropping funnel and a stirrer, it was heated up to 91° C. Separately, 0.4 liter of a 1.0 mole/liter manganese dichloride aqueous solution, 0.4 liter of a 0.5 mole/liter lithium chloride aqueous solution and 0.3 mole of hydrogen peroxide were charged into the dropping funnel and a homogeneous mixed solution was formed. The mixed solution was then dropped from the dropping funnel into the heated lithium hydroxide aqueous solution while stirring over a period of 60 minutes. After completion of dropping, reaction was conducted for one hour at 91° C. and the mixture was cooled to room temperature. Washing was then performed 3 times by a procedure in which a suspension containing the resulting produced solid was centrifuged and the supernatant was removed. The obtained solid was dried for twenty-four hours at 120° C. to obtain lithium manganate. The lithium manganate was analyzed by X-ray diffraction and a peak appeared for lithium manganate with a spinel structure (see FIG. 1). The composition was analyzed and was found to contain 90 wt % $LiMn_2O_4$ and 10 wt % $Mn_2O_3$, with a Li/Mn atomic ratio of 0.43. The mean particle size was 20.7 $\mu$m, the specific surface area was 13.1 m$^2$/g and the BET size was 0.11 $\mu$m.

Example 2

Ten grams of a compound oxide of the lithium manganate with a spinel structure obtained in Example 1 and manganese oxide was subjected to heat treatment at 700° C. for 5.5 hours. The results of analysis of the resulting lithium manganate with a spinel structure are shown in Table 1.

Example 3

Lithium manganate was obtained by an experiment conducted in the same manner as Example 1, except that 0.4 liter of a 0.4 mole/liter lithium chloride aqueous solution was used instead of 0.4 liter of a 0.5 mole/liter lithium chloride aqueous solution. The analysis results are shown in Table 2.

Example 4

Figure 2:
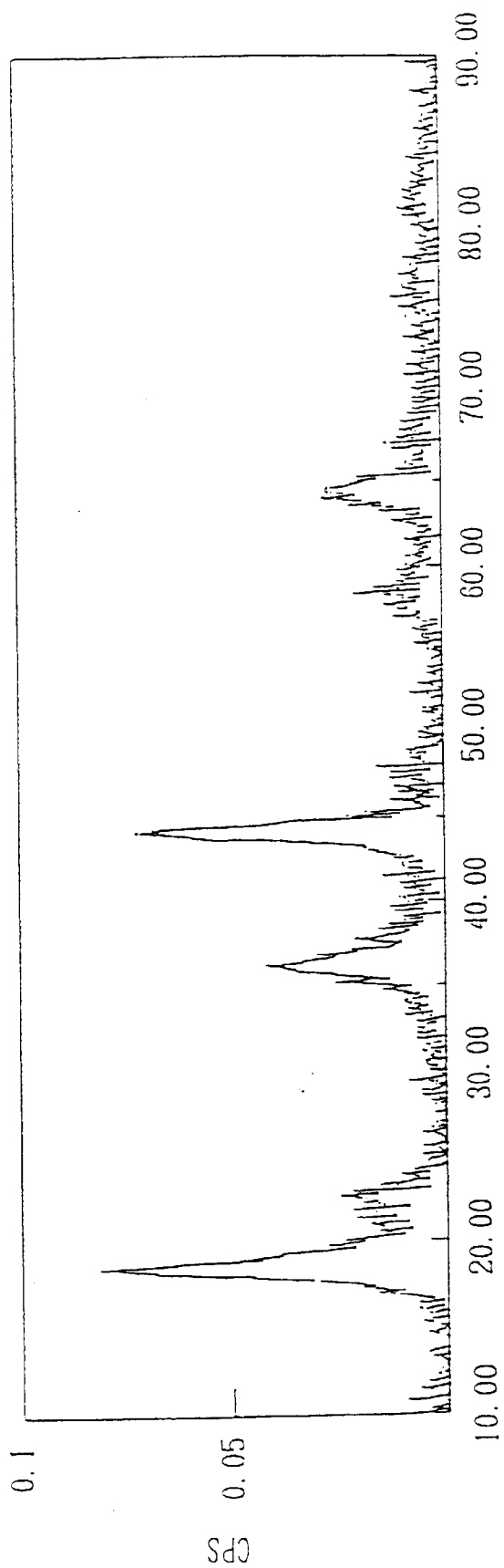
FIG. 2 is an X-ray diffraction spectrum of the lithium manganate obtained in Example 4.

Lithium manganate was obtained by an experiment conducted in the same manner as Example 1, except that 0.4 liter of a 0.52 mole/liter lithium chloride aqueous solution was used instead of 0.4 liter of a 0.5 mole/liter lithium chloride aqueous solution, and 0.6 mole of hydrogen peroxide was used instead of 0.3 mole of hydrogen peroxide. The resulting lithium manganate was analyzed by X-ray diffraction and a peak appeared for lithium manganate with a spinel structure (see FIG. 2). The analysis results are shown in Table 2.

Example 5

After loading 0.8 liter of 3.25 mole/liter lithium hydroxide aqueous solution into a 2-liter flask equipped with a 1-liter dropping funnel and a stirrer, it was heated up to 90° C. Separately, 0.4 liter of a 1.0 mole/liter manganese dichloride aqueous solution, 0.4 liter of a 0.5 mole/liter lithium chloride aqueous solution and 0.24 mole of hydrogen peroxide were charged into the dropping funnel and a homogeneous mixed solution was formed. The mixed solution was then dropped from the dropping funnel into the heated lithium hydroxide aqueous solution while stirring over a period of 60 minutes. After completion of dropping, reaction was conducted for one hour at 90° C. and the mixture was cooled to room temperature. Washing was then performed 3 times by a procedure in which a suspension containing the resulting produced solid was centrifuged and the supernatant was removed. The obtained solid was dried for twenty-four hours at 120° C. to obtain lithium manganate. The lithium manganate was analyzed by X-ray diffraction and a peak appeared for lithium manganate with a spinel structure (see FIG. 1). The composition was analyzed and was found to have a Li/Mn atomic ratio of 0.59. The mean particle size was 19.9 $\mu$m, the specific surface area was 67.6 m$^2$/g and the BET size was 0.02 $\mu$m.

Ten grams of a compound oxide of the lithium manganate with a spinel structure obtained above and manganese oxide was subjected to heat treatment at 700° C. for 5.5 hours. The results of analysis of the resulting lithium manganate with a spinel structure are shown in Table 1.

Comparative Example 1

The same experiment was conducted as in Example 1 except that manganese nitrate was used instead of manganese dichloride. Upon analysis of the obtained solid by X-ray diffraction, the appearing peak for manganese oxide was predominant, and no peak appeared for lithium manganate with a spinel structure. The analysis results of this product are also shown in Table 2.

TABLE 2

|  | Example 1 | Example 2 | Example 3 | Example 4 | Example 5 | Comp. Ex. 1 |
|---|---|---|---|---|---|---|
| $LiMn_2O_4$ | 90 | 90 | 90 | 100 | 100 | 0 |
| $Mn_2O_3$ | 10 | 10 | 8 | 0 | 0 | 30 |
| Li/Mn atomic ratio | 0.43 | 0.45 | 0.44 | 0.49 | 0.59 | — |

TABLE 2-continued

|  | Example 1 | Example 2 | Example 3 | Example 4 | Example 5 | Comp. Ex. 1 |
|---|---|---|---|---|---|---|
| Mean particle size ($\mu$m) | 20.7 | 26.2 | 16.6 | 14.6 | 39.2 | — |
| Specific surface area ($m^2/g$) | 75.2 | 13.1 | 80.1 | 99.8 | 12.2 | — |

INDUSTRIAL APPLICABILITY

According to the present invention, it is possible to produce lithium manganate with a spinel structure that is suitable as an electrode material for a lithium ion secondary battery, by contacting a manganese halide and a lithium compound in a liquid phase at 100° C. or below for reaction. This process allows production of lithium manganate with a spinel structure in a more convenient and low cost manner than by processes of the related art. Further, since the production process of the invention uses the starting materials in homogeneous aqueous solutions and contacts them in liquid phase for reaction, it is possible to obtain lithium manganate with a spinel structure that is more homogeneous and highly pure than that obtained by conventional solid phase processes.

Furthermore, by using the lithium manganate obtained by this process as the active material for a lithium ion secondary battery positive electrode, it is possible to obtain a lithium ion secondary battery with excellent charge/discharge capacity and excellent charge/discharge cycle characteristics.

What is claimed is:

1. A process for production of lithium manganate with a spinel structure consisting of directly contacting an aqueous solution of a manganese halide and an aqueous solution of a lithium compound to produce lithium manganate with a spinel structure, in a liquid phase at 100° C. or lower for reaction, and adding an oxidizing agent selected from the group consisting of hydrogen peroxide, potassium permanganate and chloric acid upon carrying out the reaction.

2. A process for production of lithium manganate according to claim 1, wherein said manganese halide is manganese chloride.

3. A process for production of lithium manganate according to claim 1, wherein said lithium compound is at least one selected from the group consisting of lithium hydroxide, lithium chloride, lithium iodine, lithium bromide, lithium nitrate, lithium nitrite, lithium sulfate, lithium hydrogen sulfate, lithium carbonate, lithium hydrogen carbonate, lithium acetate, lithium oxide, lithium peroxide and lithium chlorate.

4. A process for production of lithium manganate according to claim 1, wherein said lithium compound is lithium hydroxide or lithium chloride.

5. A process for production of lithium manganate with a spinel structure consisting of directly contacting an aqueous solution of a manganese chloride and an aqueous solution of a lithium compound to produce lithium manganate with a spinel structure, in a liquid phase in a temperature range of 80 to 100° C. for reaction, and adding an oxidizing agent selected from the group consisting of hydrogen peroxide, potassium permanganate and chloric acid upon carrying out the reaction.

6. A process for production of lithium manganate with a spinel structure consisting of after contact of a manganese halide and a lithium compound to produce lithium manganate with a spinel structure, in a liquid phase at 100° C. or below for reaction, and adding an oxidizing agent selected from the group consisting of hydrogen peroxide, potassium permanganate and chloric acid upon carrying out the reaction to form a solid, said solid is heat treated.

7. A process according to claim 1, wherein the produced lithium manganate with a spinel structure is employed as the positive electrode active material in the production of a positive electrode.

8. A process according to claim 1, wherein the produced lithium manganate with a spinel structure is employed as the positive electrode active material in the production of a lithium ion secondary battery.

* * * * *